UNITED STATES PATENT OFFICE.

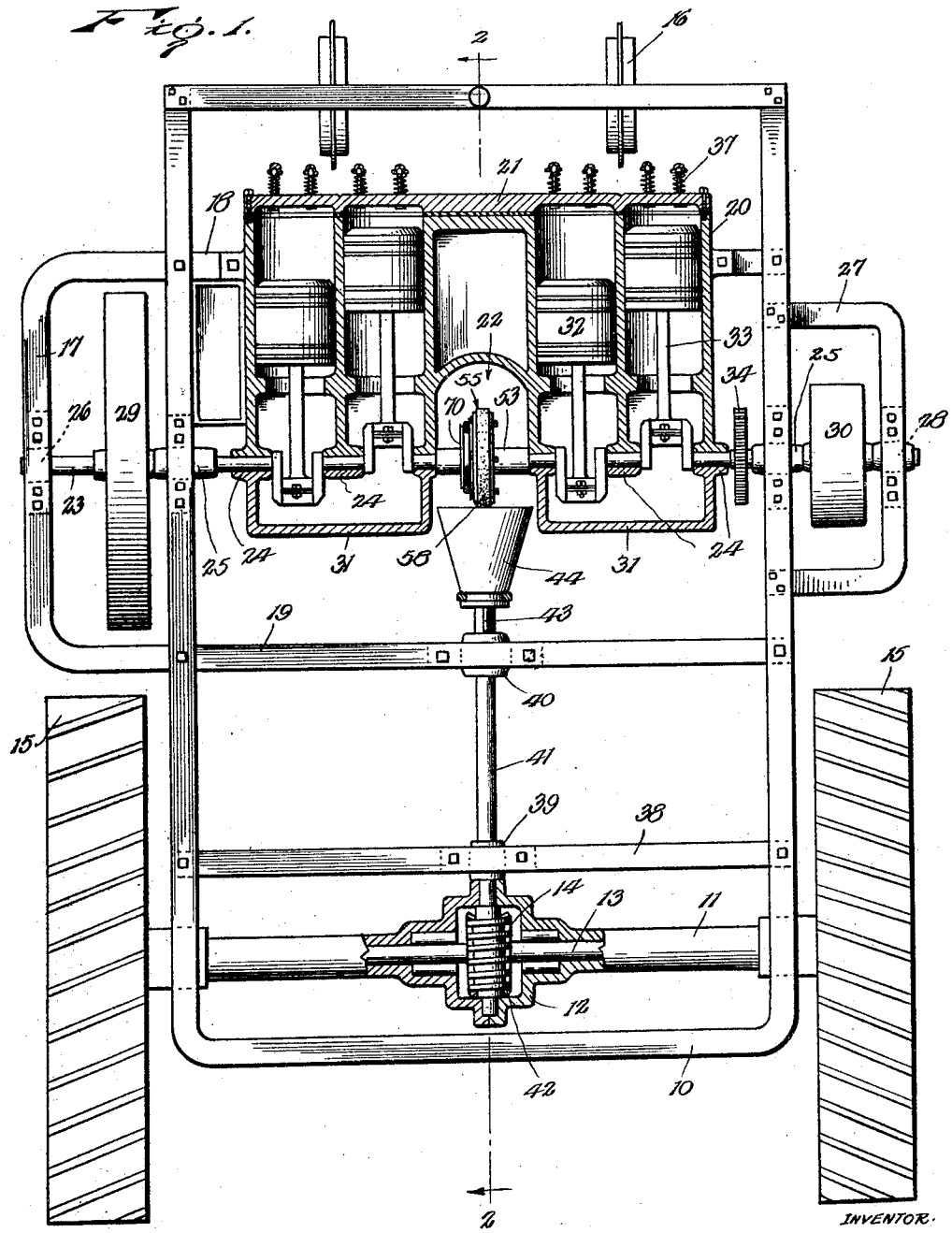

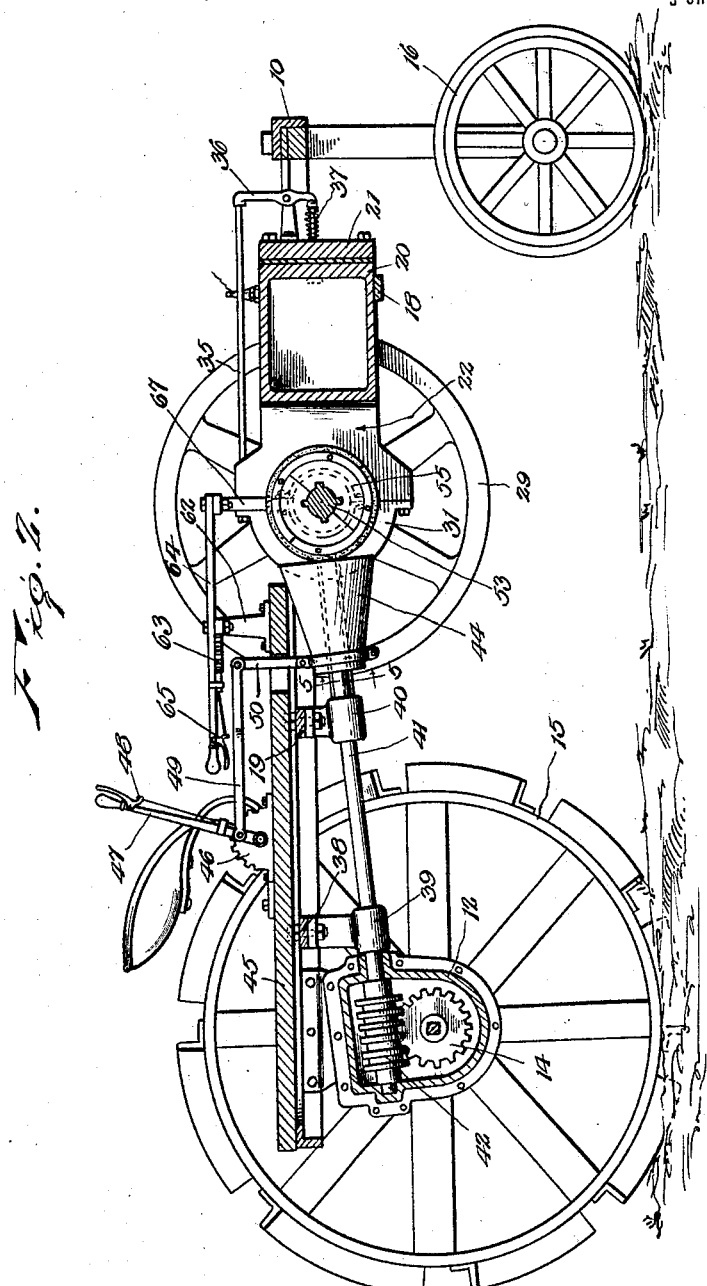

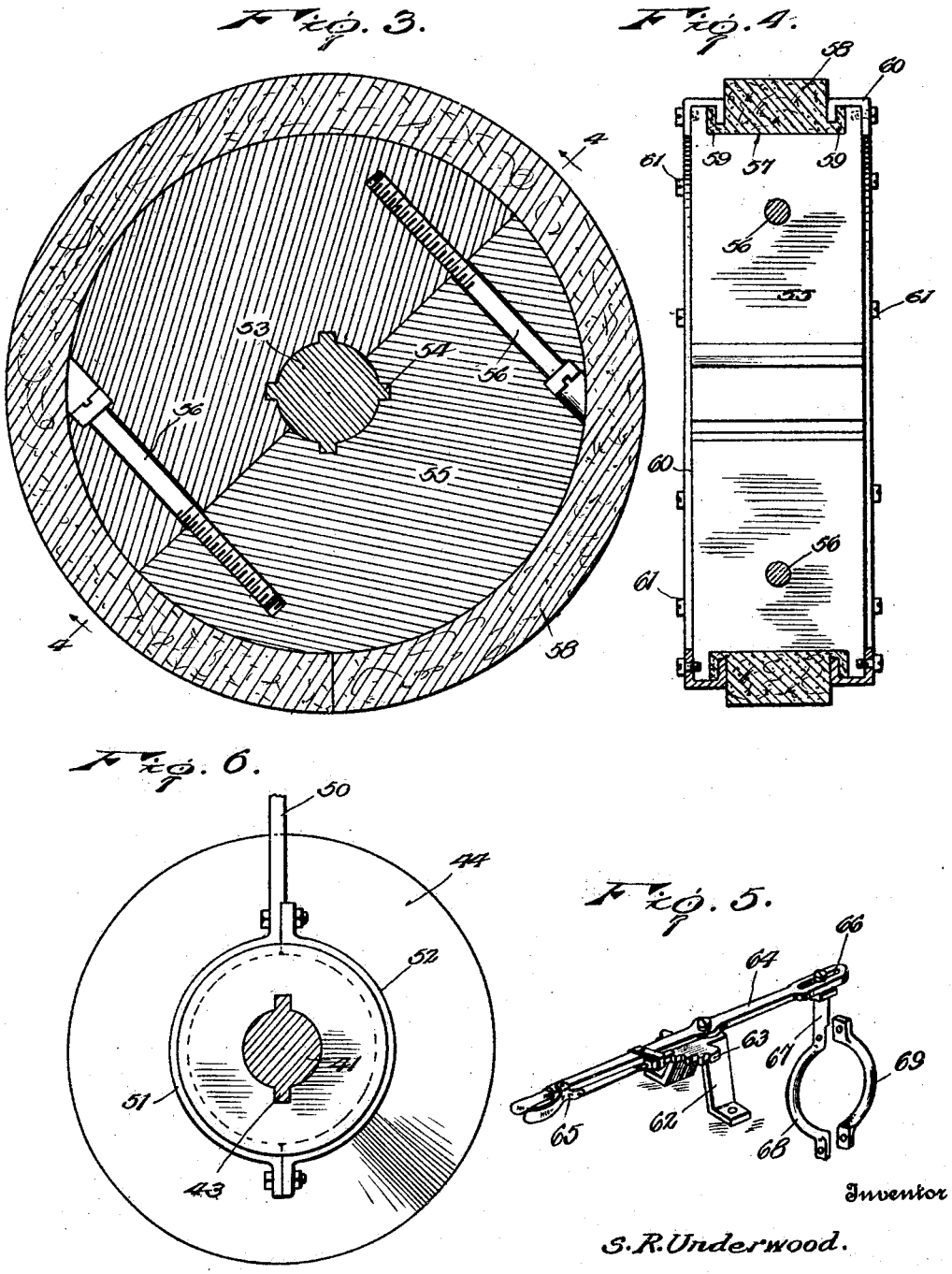

STEPHEN RALPH UNDERWOOD, OF SULLIVAN, ILLINOIS.

MOTOR VEHICLE.

1,414,235.   Specification of Letters Patent.   Patented Apr. 25, 1922.

Application filed July 12, 1921. Serial No. 484,175.

*To all whom it may concern:*

Be it known that I, STEPHEN RALPH UNDERWOOD, a citizen of the United States, residing at Sullivan, in the county of Moultrie and State of Illinois, have invented certain new and useful Improvements in Motor Vehicles, of which the following is a specification.

This invention relates to motor vehicles and has as one of its principal objects to provide a direct drive from the engine crank shaft of the vehicle to the rear axle whereby a maximum tractive effort will be realized for any given engine horsepower.

A further object of the invention is to provide a drive mechanism particularly adapted for use upon tractors or the like while, at the same time, the invention may also be embodied in pleasure vehicles or trucks.

A still further object of the invention is to provide a mechanism wherein the motive power may be readily coupled with the traction wheels without jerking or grabbing.

The invention has as a still further object to provide a mechanism wherein the speed of the vehicle may be readily controlled.

And a still further object of the invention is to provide a mechanism which will be characterized by simplicity, strength and durability.

Other and incidental objects will appear hereinafter.

In the drawings:

Figure 1 is a plan view showing the invention embodied in a tractor, parts being broken away and illustrated in section.

Figure 2 is a sectional view on the line 2—2 of Figure 1, looking in the direction of the arrows, Figure 3 is a detail section through the friction wheel employed.

Figure 4 is a section through the friction wheel at right angles to Figure 3,

Figure 5 is a detail perspective showing the mechanism employed for shifting the friction wheel, and Figure 6 is an enlarged detail section on the line 5—5 of Figure 2, looking in the direction of the arrows.

Referring now more particularly to the drawings, I employ a frame 10 to which is secured a rear axle housing 11 provided medially with a differential case 12. Extending in opposite directions from said differential case through the housing are the sections of a rear axle 13 journaled at their inner and outer end portions by suitable roller bearings. At their inner ends the axle sections coact with a worm wheel 14 and connected with the outer ends of said sections are the drive wheels 15. Supporting the frame at its forward end are the front wheels 16 of the tractor swiveled upon the front cross bar of the frame 10.

Secured to the frame near its forward end is a transversely disposed U-shaped brace member 17 having parallel side bars 18 and 19 respectively. These side bars are bolted or otherwise secured to the frame and mounted upon the bar 18 is a horizontally disposed internal combustion engine 20. In the present instance, I have shown the engine as comprising four cylinders arranged in alinement and closed at their forward ends by a head 21. Medially, the engine is formed with a cavity 22 separating the cylinders into pairs, a pair of cylinders being located at each side of said cavity, and journaled upon the engine block to extend transversely across the cavity is a crank shaft 23. The engine itself is provided with bearings 24 journaling the shaft, it being observed that bearings are provided upon the side walls of the cavity 22 so that the reach of the shaft extending across said cavity will be rigidly supported. Upon the side bars of the frame 10 are elongated bearings 25 for the shaft while upon the member 17 is a bearing 26 journaling the shaft at one end. Secured to the frame at its opposite side is a bracket 27 mounted upon this bracket is a bearing 28 journaling the shaft at its opposite end. As will thus be seen, the shaft will be effectually supported, and fixed to one end portion of the shaft within the member 17 is a flywheel 29 while to the opposite end portion of the shaft is secured a pulley 30 arranged within the bracket 27, the pulley being, of course, for belt work. Closing each of the pairs of cylinders of the engine is a crank case member 31 and mounted to reciprocate within said cylinders are pistons 32 from which extend connecting rods 33 engaged with the crank shaft. The crank shaft carries a suitable timing gear 34 for driving the cam shaft of the engine and operable by this latter shaft are push rods 35 slidable through the base of the engine block and cooperating at their forward ends with rockers 36 which, in turn, are mounted to actuate the valve 37 of the engine. It will, of course, be understood that while I have shown a four-cylinder engine, still, the number of cylinders may be varied as desired and, as will be well understood, the cylinders will, in practice, be jacketed.

Extending transversely between the side bars of the frame 10 near its rear end is a cross bar 38 and mounted upon said cross bar is a bearing 39. Alining with this bearing is a bearing 40 upon the bar 19 of the member 17 and journaled through said bearings is a propeller shaft 41 extending into the differential case 12 and provided with a worm 42 meshing with the worm wheel 14. At its forward end portion the shaft is, as shown in Figure 6, provided with a pair of longitudinally directed keys or ribs 43 and slidable on the shaft to coact with said keys is a conical friction disc 44 received between the confronting ends of the crank case members 31 of the engine. As shown in Figure 2, the frame 10 carries a floor 45 and upstanding from the floor is a segment 46 upon which is pivoted a lever 47 having a latch 48 to cooperate with the segment. Extending forwardly from the lever is a rod 49 to the forward end of which is secured an arm 50 extending through a suitable slot in the floor. At its lower end portion this arm is, as shown in Figure 6, shaped to provide one section 51 of a collar and mating with said section is a detachable section 52, the collar seating in a suitable annular groove near the rear end of the disc. Thus, as will be seen, the disc may turn within the collar while the lever 47 may be swung for shifting said collar either forwardly or rearwardly upon the propeller shaft.

Between the side walls of the cavity 22 of the engine, the crank shaft 23 is provided with an enlarged portion 53 having, as shown in Figure 3, a plurality of longitudinally directed keys or ribs 54 and mounted upon the enlarged portion of the shaft is a friction wheel 55 having slots accommodating said keys so that the wheel will thus be driven by the shaft. The wheel is preferably formed of mating semi-circular sections secured together by tie bolts 56 and formed in the periphery of the wheel is a channel 57 in which is seated a friction band 58 of approved material, this band being provided at opposite sides thereof with channeled beads 59. Engaging over the side walls of the channel 57 are split channel shaped clamping rings 60, the outer flange of each ring seating flat against one side face of the wheel and the inner flange thereof engaging in the channel of one of the beads 59. Detachably securing said rings to the wheel are cap screws 61. Thus, the band will be tightly held upon the wheel while, when necessary, said band may be readily renewed.

Secured to the floor 45 near its forward end is an upstanding bracket 62 provided, as particularly shown in Figure 5, with a segment 63 and pivoted upon said bracket is a lever 64 having a latch 65 to cooperate with the segment. Formed in this bracket at its forward end is a slot 66 and slidably engaging in said slot is the upper end of an arm 67. This arm is formed to provide one section 68 of a collar and mating with said section is the other section 69 of the collar, the collar engaging in a suitable annular channel in the hub 70 of the friction wheel. Thus, the lever 64 may be rocked for shifting the friction wheel along the crank shaft of the engine transversely with respect to the friction disc 44.

As will now be understood in view of the preceding description, after the engine 20 has been started, the lever 47 may be operated for advancing the friction disc 44 against the friction band 58 of the friction wheel 55 for driving the tractor, it being readily possible, as will be appreciated, to start the tractor gradually without jerk or grabbing between the friction wheel and disc. As will be particularly noted, the motive power is taken directly from the crank shaft of the engine and is transmitted direct to the rear axle, all speed gearing being eliminated. Accordingly, I provide an arrangement whereby a substantially maximum tractive effort will be realized from the engine. The speed of the tractor as well as the direction of movement thereof is controlled by means of the lever 64. By moving the friction wheel along the crank shaft toward the periphery of the friction disc, the speed of the tractor will, as will be appreciated, be gradually increased while by shifting the wheel to coact with said disc at either one side or the other of the plane of the propeller shaft 41, the tractor may be driven forwardly or rearwardly. I accordingly provide a highly effective construction for the purposes set forth and while I have illustrated and described the invention as embodied in a tractor still, as will be at once appreciated, the invention may also be well embodied in trucks or pleasure vehicles. Furthermore, while I have illustrated the preferred embodiment of the invention, various minor changes may be made therein, as dictated by practical working conditions. I accordingly reserve the right to all such variations as may fall within the spirit of the appended claims.

Having thus described the invention, what is claimed as new is:

1. In a motor vehicle, the combination of an engine comprising a block having cylinders and provided between said cylinders with a cavity, a crank shaft journaled upon the block to extend across said cavity exposed at the cavity, the block integrally and permanently connecting the cylinders for rigidly supporting the crank shaft at opposite sides of said cavity, a propeller shaft, a driving element on the exposed portion of the crank shaft, and a driving element on the propeller shaft coacting with the first element.

2. In a motor vehicle, the combination of an engine block having a cavity, a crank shaft journaled upon the block at opposite sides of the cavity extending across the cavity, the block integrally and permanently connecting the bearings for the shaft for rigidly supporting said shaft, a propeller shaft, a driving element on the crank shaft at said cavity, and a driving element on the propeller shaft coacting with the first element.

3. In a motor vehicle, the combination of a frame, an engine carried thereby having a crank shaft journaled upon the frame and projecting at its ends beyond the lines thereof, brackets upon the frame journaling the projecting ends of the crank shaft, a pulley upon one end of the shaft between one of the brackets and the frame, a flywheel upon the other end of the shaft between the other of the brackets and the frame, a propeller shaft for the vehicle, and coacting driving elements on said shafts providing a driving connection therebetween.

4. In a motor vehicle, the combination of a chassis frame having side bars, an engine mounted upon the frame and having a crank shaft extending from one side of the frame to the other journaled near its ends upon said side bars supporting the engine upon the frame and securing the engine against angular movement with respect to the frame, a propeller shaft for the vehicle, and coacting driving elements on said shafts providing a driving connection therebetween.

5. In a motor vehicle, the combination of a chassis frame having side bars, an engine mounted upon the frame and having a crank shaft extending from one side of the frame to the other journaled near its ends upon said side bars supporting the engine upon the frame and securing the engine against angular movement with respect to the frame, a propeller shaft for the vehicle, coacting driving elements upon said shafts providing a driving connection therebetween, the crank shaft projecting beyond one of said side bars, and a pulley carried by the projecting portion of the crank shaft at the outer side of said side bar.

In testimony whereof I affix my signature.

STEPHEN RALPH UNDERWOOD.